US006718268B2

(12) United States Patent
Fantana et al.

(10) Patent No.: US 6,718,268 B2
(45) Date of Patent: Apr. 6, 2004

(54) APPARATUS FOR MEASURING A CONTACT PRESSURE OF A WINDING COMPRESSION ELEMENT IN A POWER TRANSFORMER

(75) Inventors: Nicolaie Laurentiu Fantana, Leimen (DE); Armin Gasch, Heidelberg (DE); Albrecht Vogel, Stutensee (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/058,521

(22) Filed: Jan. 28, 2002

(65) Prior Publication Data
US 2002/0107657 A1 Aug. 8, 2002

Related U.S. Application Data

(63) Continuation of application No. PCT/EP00/06742, filed on Jul. 14, 2000.

(30) Foreign Application Priority Data

Jul. 28, 1999 (DE) .......................................... 199 35 515

(51) Int. Cl.[7] .............................................. G06F 19/00
(52) U.S. Cl. ........................... 702/41; 702/42; 702/140; 702/188; 73/760; 73/763; 73/768
(58) Field of Search ......................... 702/140, 42, 188, 702/138, 41; 73/760, 763, 768; 324/547

(56) References Cited

U.S. PATENT DOCUMENTS

| | | | | |
|---|---|---|---|---|
| 3,855,503 A | * | 12/1974 | Ristuccia .................... 364/37 |
| 3,929,010 A | * | 12/1975 | Tjernstrom ............... 73/862.51 |
| 4,627,292 A | * | 12/1986 | Dekrone ...................... 73/728 |
| 4,857,856 A | * | 8/1989 | Coleman et al. ............ 324/547 |
| 4,972,353 A | * | 11/1990 | Kennedy et al. .......... 455/193.1 |
| 5,142,166 A | * | 8/1992 | Birx ........................... 307/419 |
| 5,327,113 A | * | 7/1994 | Voetsch ....................... 336/197 |
| 5,331,747 A | * | 7/1994 | Stanton ....................... 34/405 |
| 5,726,617 A | * | 3/1998 | Pla et al. .................... 336/100 |
| 5,966,008 A | * | 10/1999 | Maier et al. .................. 324/96 |
| 6,494,617 B1 | * | 12/2002 | Stokes et al. ............... 374/152 |

FOREIGN PATENT DOCUMENTS

| | | |
|---|---|---|
| DE | 35 36 900 A1 | 4/1987 |
| DE | 42 43 090 C1 | 7/1994 |
| DE | 44 13 211 A1 | 10/1995 |
| DE | 195 35 543 A1 | 4/1997 |
| DE | 196 40 822 A1 | 4/1997 |

* cited by examiner

Primary Examiner—John Barlow
Assistant Examiner—Demetrius Pretlow
(74) Attorney, Agent, or Firm—Laurence A. Greenberg; Werner H. Stemer; Ralph E. Locher

(57) ABSTRACT

An apparatus for measuring a contact pressure exerted by a winding compression element on a winding in a power device such as a power transformer includes a sensor having a sensor element which reacts to pressure or strain. The sensor is disposed in the winding compression element. The sensor is configured to communicate, via a radio link, with an electronic checking device.

9 Claims, 4 Drawing Sheets

APPARATUS FOR MEASURING A CONTACT PRESSURE OF A WINDING COMPRESSION ELEMENT IN A POWER TRANSFORMER

CROSS-REFERENCE TO RELATED APPLICATION

This application is a continuation of copending International Application No. PCT/EP00/06742, filed Jul. 14, 2000, which designated the United States.

BACKGROUND OF THE INVENTION

Field of the Invention

The invention relates to an apparatus for measuring the contact pressure which is exerted by a winding compression element on a winding in a power device, for example a power transformer.

The windings, particularly in power transformers, are composed of a combination of conductors and insulating materials. The windings are a complex structure, with a basically cylindrical geometry. After manufacturing or winding the transformer, the windings are provided such that they are enclosed by the iron core of the transformer.

Transformer windings must be configured such that they have sufficient mechanical strength and robustness in order to withstand short-circuits and other mechanical forces throughout the entire life of the transformer. One particularly important aspect is the compression of the windings, which produces good mechanical robustness.

The pressure which acts on the windings in the transformer due to the compression decreases over the course of time as a consequence of a number of influences. This then results in the mechanical strength often being inadequate in the event of short-circuits, with an increased probability of destruction of the transformer. No apparatuses installed in transformers are known which would allow detecting changes in the contact pressure.

By way of example, FIG. 6 shows a typical profile of the decreasing contact pressure, which was determined off-line, in each case after a short-circuit had occurred. FIG. 7 shows a profile which was recorded off-line at planned time intervals. Transformer windings are normally compressed during production. There is no capability to detect any change during operation. Recompression for correction purposes is feasible only during extensive repair work, for example when one of the windings needs to be replaced.

Even when configurations are used through the use of which the compression is readjusted to a certain extent by mechanical elastic elements during the operating period there is in principle no objective information about the actual state of the compression of the winding, and hence no information about the state of the transformer.

SUMMARY OF THE INVENTION

It is accordingly an object of the invention to provide an apparatus for measuring the contact pressure of a winding compression element in a power transformer.

With the foregoing and other objects in view there is provided, in accordance with the invention, in combination with a power device having a winding and a winding compression element exerting a contact pressure on the winding, an apparatus for measuring the contact pressure, including:

a sensor having a sensor element reacting to one of pressure and strain, the sensor being placed in the winding compression element; and the sensor being configured to communicate via a radio link.

The apparatus allows the resultant contact pressure to be detected by measurement at any time, and hence the residual contact pressure, which still exists after a relatively long operating period, as well.

According to another feature of the invention, an electronic checking device is operatively connected to the sensor via the radio link.

According to yet another feature of the invention, at least one sensor antenna is electrically connected to the sensor.

According to a further feature of the invention, the power device is a power transformer configuration having a transformer tank with a wall; the winding is disposed in the transformer tank; a radio-frequency bushing extends through the wall of the transformer tank; a checking antenna is disposed in the transformer tank; and the electronic checking device is provided outside the transformer tank and is operatively connected to the checking antenna via the radio-frequency bushing.

According to another feature of the invention, the electronic checking device and the sensor are configured such that the electronic checking device transmits a radio-frequency signal, the sensor receives the radio-frequency signal and converts the radio-frequency signal into a mechanical surface acoustic wave, which propagates in the sensor and is reflected in the sensor, the sensor then converts the mechanical surface acoustic wave back to an electromagnetic wave and transmits the electromagnetic wave to the electronic checking device, and the electronic checking device evaluates the electromagnetic wave received from the sensor.

According to another feature of the invention, the sensor element is an SAW (Surface Acoustic Wave) sensor element.

According to yet another feature of the invention, the sensor includes an encapsulation, the sensor element is hermetically sealed in the encapsulation, and the encapsulation is configured as an elastic deformation body.

According to another feature of the invention, the sensor is placed in a spring element.

With the objects of the invention in view there is also provided, a power device, such as a power transformer, including:

a winding;

a winding compression element exerting a contact pressure on the winding;

a measuring device for measuring the contact pressure exerted on the winding, the measuring device including a sensor having a sensor element reacting to one of pressure and strain, the sensor being disposed in the winding compression element; and the sensor being configured to communicate via a radio link.

Other features which are considered as characteristic for the invention are set forth in the appended claims.

Although the invention is illustrated and described herein as embodied in an apparatus for the measurement of the contact pressure of a winding compression element in a power transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
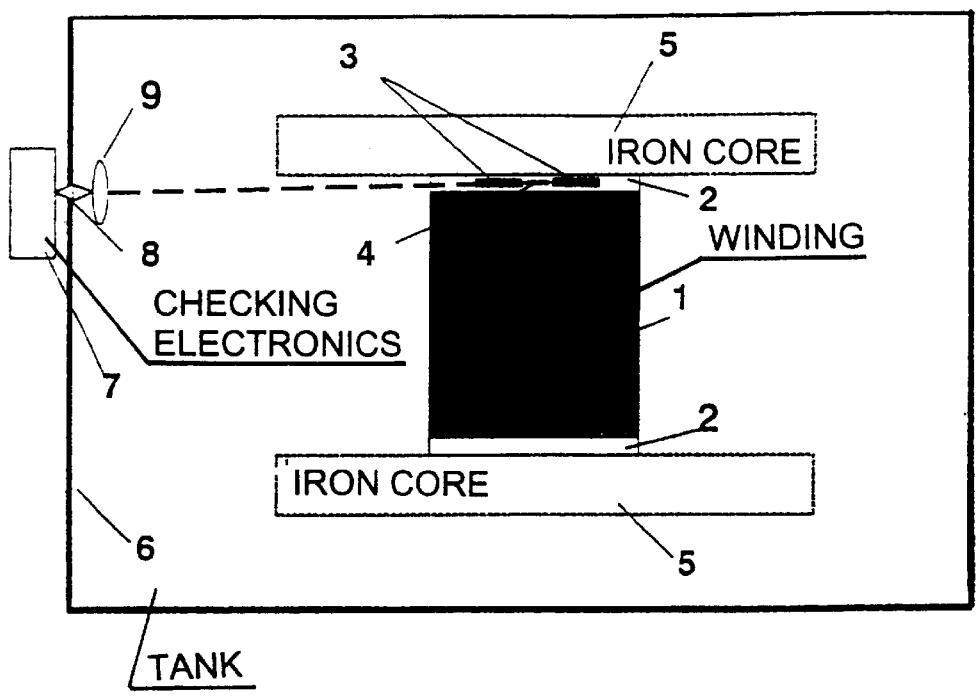
FIG. 1 is a diagrammatic sectional view of the measurement apparatus according to the invention provided in a power transformer.

Referring now to the figures of the drawings in detail and first, particularly, to FIG. 1 thereof, there is shown an overview of a configuration of the apparatus according to the invention in a power transformer. FIG. 1 shows one of a number of windings 1. A limb of an iron core 5, which cannot be seen in the drawing, is located inside the winding 1. Winding compression elements 2 are in each case inserted between the upper and lower yoke of the core 5 and the winding 1.

In the illustrated example, a sensor 4 is provided in the region of the upper compression elements 2. A number of sensors 4 may also be provided there. The sensor 4 is preferably provided on the side of the compression elements 2 facing the core yoke 5. Sensors 4 which react to pressure or strain are suitable for use, depending on the configuration and placement.

The at least one sensor 4 is in the form of a wireless miniature sensor, that is to say a miniature sensor which can be checked by radio. The sensor element contained in the sensor 4 is thus electrically connected to at least one radio-frequency or microwave antenna, which is annotated as the sensor antenna 3.

The core 5, together with the windings 1, is located within a tank 6 in a power transformer. An electronic checking device 7 is provided outside the tank 6, and a checking antenna 9 is connected to them via a radio-frequency bushing 8 which passes through the wall of the tank 6. The checking antenna 9 and the sensor antenna 3 are provided such that a radio link is possible. The electronic checking device 7 contains a transmitter and a receiver as well as control and monitoring devices.

The measurement apparatus, which is formed by an electronic checking device 7 in conjunction with the sensor 4 and the antennas 3, 9, can preferably be configured, and can operate, using SAW technology, which is described, for example, in Published, Non-Prosecuted German Patent Application Nos. DE 44 13 211 A1 and DE 195 35 543 A1.

The abbreviation SAW stands for Surface Acoustic Waves. The radio transmission takes place at frequencies in the range from 30 MHz to 3 GHz. SAW sensors contain a thin platelet composed of a piezoelectric crystal as the sensor element. The radio-frequency signal emitted from the checking device 7 is received by the antenna 3 of the sensor 4 and is converted by an (interdigital) transducer to a mechanical SAW which then propagates. The propagating SAW are reflected back to the transducer in the sensor 4 via suitable reflective structures and, in the sensor 4, they are converted back to an electromagnetic wave and are transmitted by the antenna 3. In SAW sensors, the physical variable which is intended to be measured must influence the characteristics of the surface acoustic wave. In general, the propagation speed and the path distance vary. Mechanical forces such as bending and pressure change both the acoustic path length and the elastic constants of the crystal, and hence the SAW speed. The electronic checking device 7 evaluate the delay time or phase shift, signal amplitude and signal form as well as the shift in the mid-frequency in the case of resonant sensors. Since SAW sensors are passive elements, that is to say there are neither any batteries nor any active electronic elements on the substrate, they are particularly suitable for long-term use in severe environmental conditions.

Figure 2A:
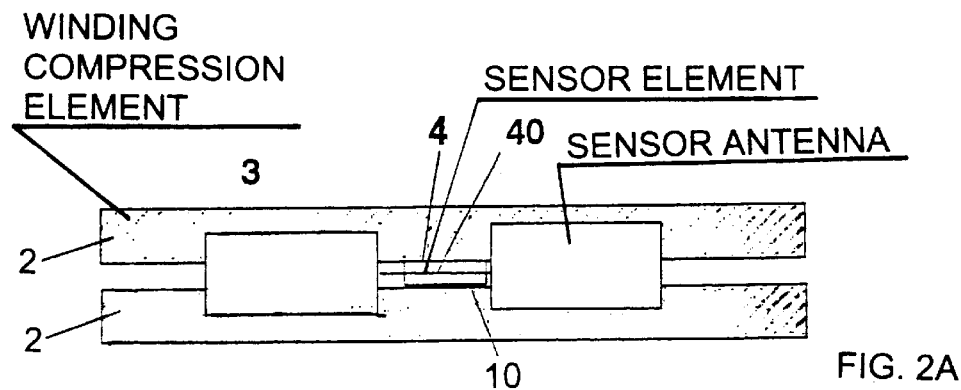
FIG. 2A is a diagrammatic view of an exemplary embodiment of a pressure sensor disposed between compression elements and a configuration of antennas according to the invention.
Figure 2B:
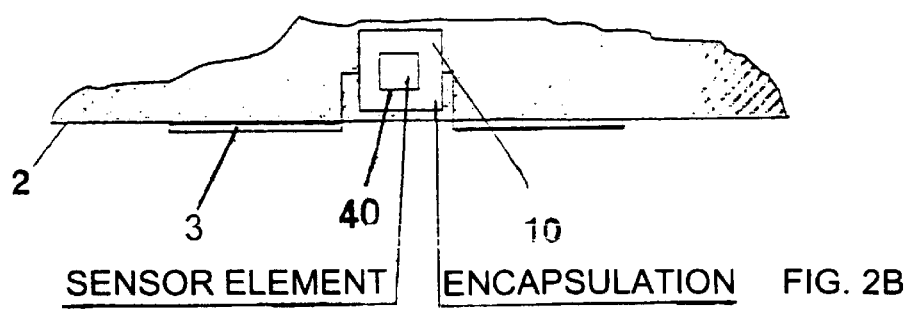
FIG. 2B is a diagrammatic partial view of the exemplary embodiment of the pressure sensor configuration shown in FIG. 2A.
Figures 3, 4:
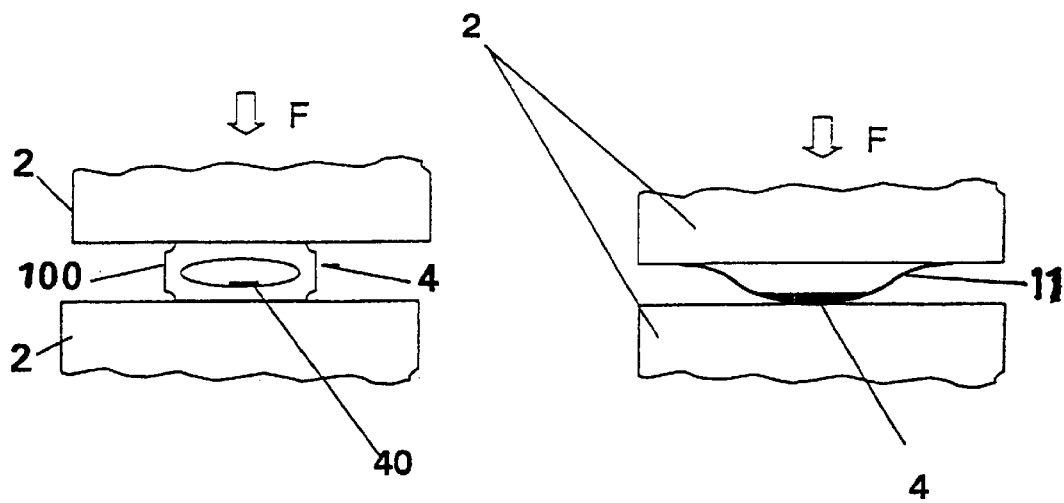
FIG. 3 is a diagrammatic partial view of a first embodiment of a configuration of a sensor element according to the invention, with the sensor element being provided in an elastic deformation body.
FIG. 4 is a diagrammatic partial view of a first embodiment of a configuration of a sensor element according to the invention, with the sensor element being provided in a spring element.

FIGS. 2A and 2B show one possible configuration of a sensor 4, and of two sensor antennas 3 connected to it. The sensor 4 contains a sensor element 40, in the form of a chip, within a hermetically sealed and elastic encapsulation 10. The encapsulation 10 protects the sensor element 40 from chemical influences which could lead to signal corruption and ageing effects. Since SAW sensors are also sensitive to expansion/compression, it is advantageous to install the elements such that the housing shape converts a compression force to expansion/compression. FIGS. 3 and 4 show examples of elastically deformable sensors 4.

FIG. 3 shows an embodiment of a sensor 4 resulting from placing an element 40 within an elastic deformation body 100. FIG. 4 shows a combination of a sensor 4 with a spring element 11.

Figure 5:
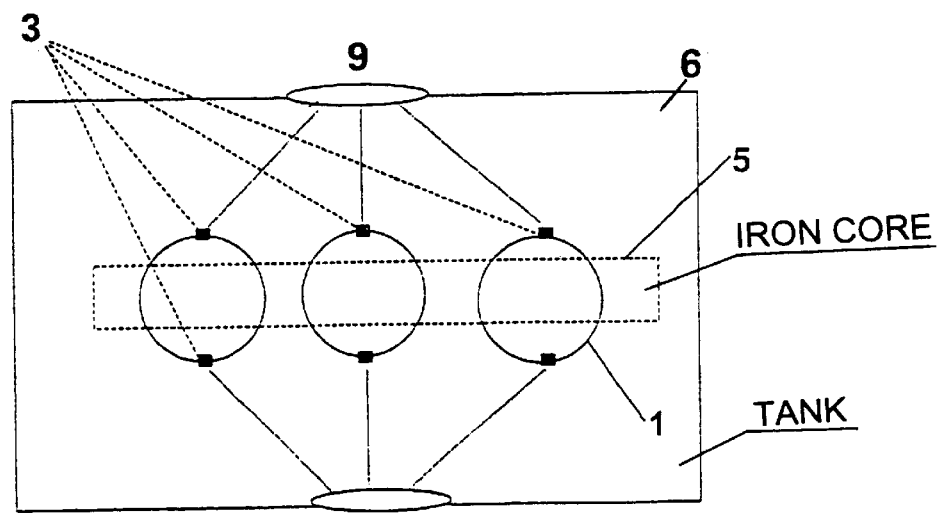
FIG. 5 is a diagrammatic view illustrating an antenna configuration for the sensor according to the invention.

FIG. 5 shows one possible antenna configuration, with a number of sensor antennas 3, interacting with a common checking or interrogation antenna 9.

Figure 6:
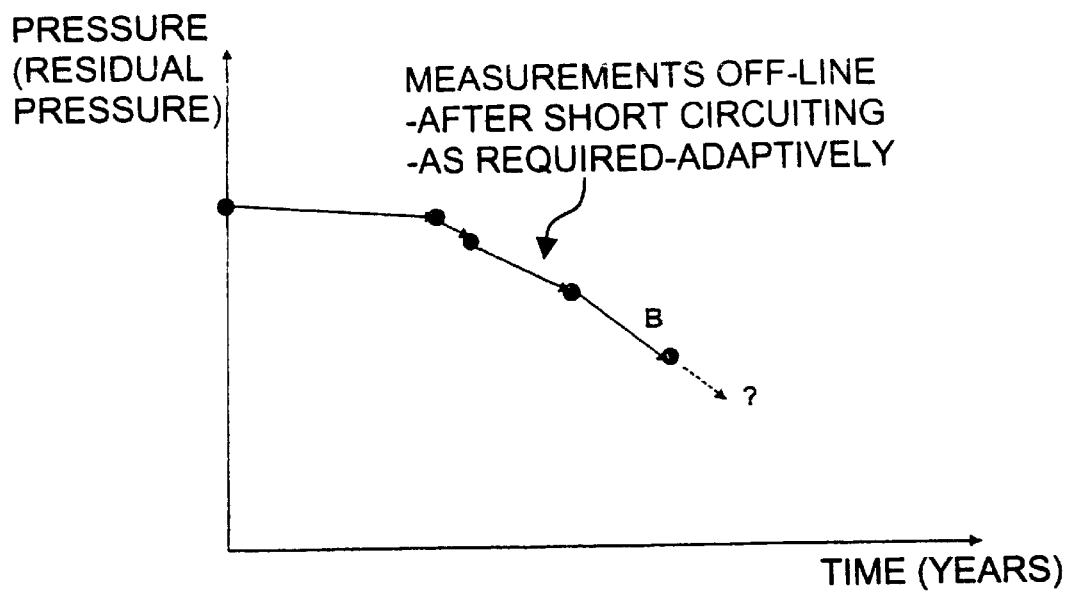
FIG. 6 is a graph illustrating a typical profile of the contact pressure of a winding compression element that was recorded off-line at individual points respectively after a short-circuit.
Figure 7:
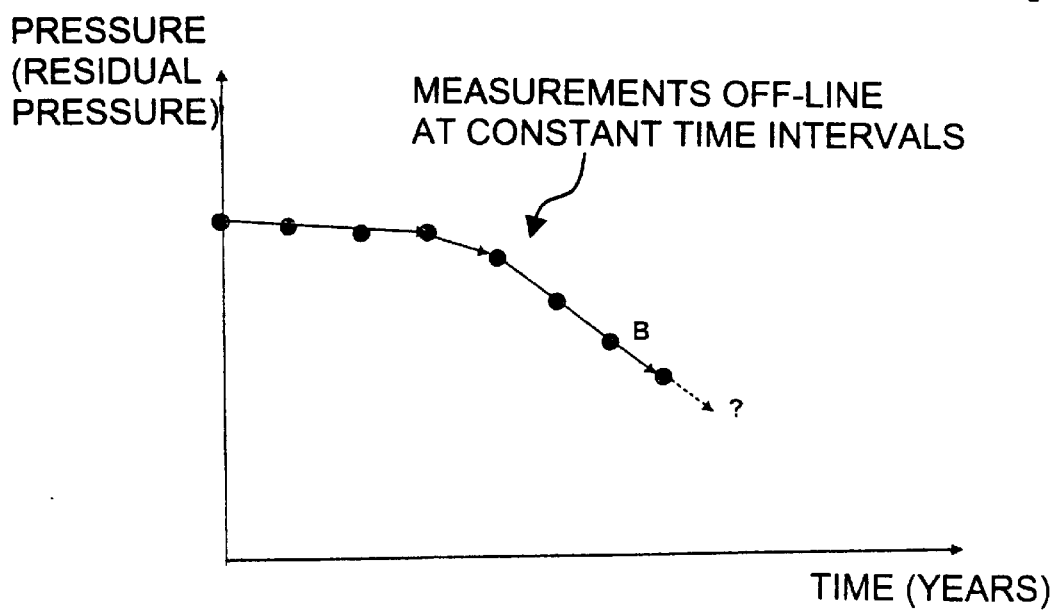
FIG. 7 is a graph illustrating a typical profile of the contact pressure recorded at constant time intervals.
Figure 8:
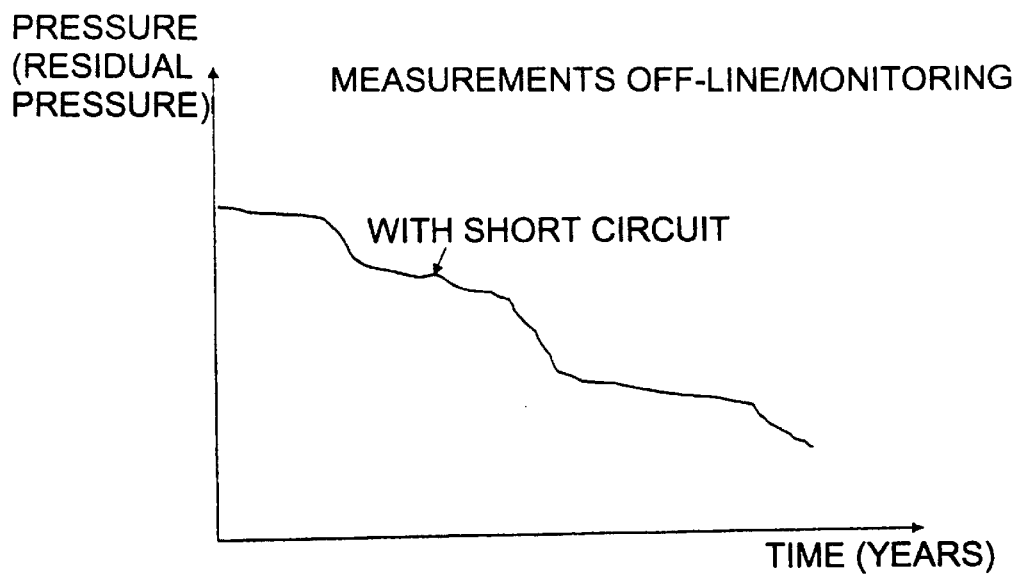
FIG. 8 is a graph illustrating a profile of the contact pressure recorded on-line using an apparatus according to the invention.
Figure 9:
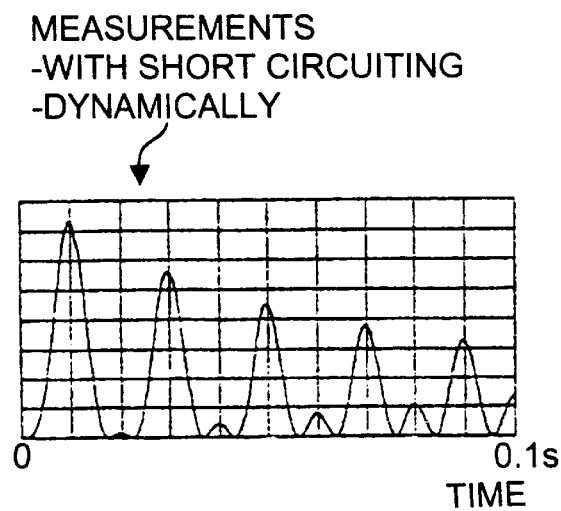
FIG. 9 is a graph illustrating a pressure profile which may be recorded dynamically in the event of a short-circuit.

FIG. 8 shows, in a similar way as in the above-described FIGS. 6 and 7, a profile of the contact pressure as a function of time, but in this case recorded on-line, continuously over several years, through the use of a configuration according to the invention. However, the same configuration can also be used, for example in the case of a short-circuit, to record the dynamic change in the contact pressure over a very short time period, for example over 100 ms as is illustrated in FIG. 9.

We claim:

1. In combination with a power device having a winding and a winding compression element exerting a contact pressure on the winding, an apparatus for measuring the contact pressure, comprising:

a sensor having a sensor element reacting to one of pressure and strain, said sensor being placed in the winding compression element; and said sensor being configured to communicate via a radio link.

2. The apparatus according to claim 1, including an electronic checking device operatively connected to said sensor via the radio link.

3. The apparatus according to claim 1, including at least one sensor antenna electrically connected to said sensor.

4. The apparatus according to claim 2, wherein:

the power device is a power transformer configuration having a transformer tank with a wall;

the winding is disposed in the transformer tank;

a radio-frequency bushing extends through the wall of the transformer tank;

a checking antenna is disposed in the transformer tank; and said electronic checking device is provided outside the transformer tank and is operatively connected to said checking antenna via said radio-frequency bushing.

5. The apparatus according to claim 2, wherein said electronic checking device and said sensor are configured such that said electronic checking device transmits a radio-frequency signal, said sensor receives the radio-frequency signal and converts the radio-frequency signal into a mechanical surface acoustic wave, which propagates in said sensor and is reflected in said sensor, said sensor then converts the mechanical surface acoustic wave back to an electromagnetic wave and transmits the electromagnetic wave to said electronic checking device, and said electronic checking device evaluates the electromagnetic wave received from said sensor.

6. The apparatus according to claim 1, wherein said sensor element is an SAW sensor element.

7. The apparatus according to claim 1, wherein said sensor includes an encapsulation, said sensor element is hermetically sealed in said encapsulation, and said encapsulation is configured as an elastic deformation body.

8. The apparatus according to claim 1, including a spring element, said sensor being placed in said spring element.

9. A power device, comprising:

a winding;

a winding compression element exerting a contact pressure on said winding;

a measuring device for measuring the contact pressure exerted on said winding, said measuring device including a sensor having a sensor element reacting to one of pressure and strain, said sensor being disposed in said winding compression element; and said sensor being configured to communicate via a radio link.

* * * * *